(12) United States Patent
Ha et al.

(10) Patent No.: US 11,501,090 B2
(45) Date of Patent: Nov. 15, 2022

(54) METHOD AND SYSTEM FOR REMOTE COMMUNICATION BASED ON REAL-TIME TRANSLATION SERVICE

(71) Applicant: VIRNECT inc., Seoul (KR)

(72) Inventors: Tae Jin Ha, Gimpo-si (KR); Chang Kil Jeon, Hanam-si (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 17/565,279

(22) Filed: Dec. 29, 2021

(65) Prior Publication Data

US 2022/0207246 A1   Jun. 30, 2022

(30) Foreign Application Priority Data

Dec. 30, 2020   (KR) .................. 10-2020-0188504

(51) Int. Cl.
*G06F 40/58*    (2020.01)
*G06F 40/279*   (2020.01)
(Continued)

(52) U.S. Cl.
CPC ............ *G06F 40/58* (2020.01); *G06F 40/279* (2020.01); *G10L 13/086* (2013.01); *G10L 15/005* (2013.01); *G10L 15/26* (2013.01)

(58) Field of Classification Search
CPC .................................................... G06F 40/40
See application file for complete search history.

(56) References Cited

U.S. PATENT DOCUMENTS 9,830,318 B2 *  11/2017  Waibel ............... G06F 40/44
10,388,272 B1 *  8/2019  Thomson .............. G06F 40/44
(Continued)

FOREIGN PATENT DOCUMENTS

JP    2008083994        4/2008
KR   20080094068 A    10/2008
(Continued)

OTHER PUBLICATIONS

Kuo, Hong-Kwang, et al. "Out-of-vocabulary word detection in a speech-to-speech translation system." 2014 IEEE International Conference on Acoustics, Speech and Signal Processing (ICASSP). IEEE, 2014. (Year: 2014).*

(Continued)

*Primary Examiner* — Jialong He
(74) *Attorney, Agent, or Firm* — STIP Law Group, LLC

(57) ABSTRACT

A method for remote communication based on a real-time translation service according to an embodiment of the present disclosure, as a method for providing remote communication based on a real-time translation service by a real-time translation application executed by at least one or more processors of a computing device, comprises performing augmented reality-based remote communication; setting an initial value of a translation function for the remote communication; obtaining communication data of other users through the remote communication; performing language detection for the obtained communication data; when a target translation language is detected within the communication data from the performed language detection, translating communication data of the target translation language detected; and providing the translated communication data.

9 Claims, 6 Drawing Sheets

(51) Int. Cl.
*G10L 13/08* (2013.01)
*G10L 15/00* (2013.01)
*G10L 15/26* (2006.01)

(56) References Cited

U.S. PATENT DOCUMENTS

| | | | | |
|---|---|---|---|---|
| 10,769,387 | B2* | 9/2020 | Wang | G06F 40/58 |
| 2002/0169592 | A1* | 11/2002 | Aityan | G06F 40/58 |
| | | | | 704/2 |
| 2008/0077390 | A1* | 3/2008 | Nagao | G10L 15/28 |
| | | | | 704/7 |
| 2009/0281789 | A1* | 11/2009 | Waibel | G06F 40/40 |
| | | | | 704/260 |
| 2010/0121629 | A1* | 5/2010 | Cohen | G06Q 40/12 |
| | | | | 704/235 |
| 2011/0093254 | A1* | 4/2011 | Kuhn | G06F 40/103 |
| | | | | 704/2 |
| 2012/0035908 | A1* | 2/2012 | Lebeau | G06F 40/40 |
| | | | | 704/E11.001 |
| 2012/0078608 | A1* | 3/2012 | Waibel | G06F 40/58 |
| | | | | 704/E11.001 |
| 2014/0337989 | A1* | 11/2014 | Orsini | H04L 51/12 |
| | | | | 726/26 |
| 2014/0358516 | A1* | 12/2014 | Lin | G06F 40/58 |
| | | | | 704/2 |
| 2014/0365200 | A1* | 12/2014 | Sagie | G06F 40/51 |
| | | | | 704/2 |
| 2015/0127319 | A1* | 5/2015 | Hwang | G06F 40/40 |
| | | | | 704/2 |
| 2015/0134322 | A1* | 5/2015 | Cuthbert | G06F 40/58 |
| | | | | 704/3 |
| 2015/0154183 | A1* | 6/2015 | Kristjansson | H04N 7/15 |
| | | | | 704/E13.001 |
| 2015/0347399 | A1* | 12/2015 | Aue | H04M 11/10 |
| | | | | 704/2 |
| 2016/0085747 | A1* | 3/2016 | Kamatani | G06F 40/58 |
| | | | | 704/277 |
| 2016/0336008 | A1* | 11/2016 | Menezes | G06F 40/295 |
| 2020/0066254 | A1* | 2/2020 | Hiroe | H04W 4/00 |
| 2020/0175988 | A1* | 6/2020 | Iwata | G06F 40/58 |

FOREIGN PATENT DOCUMENTS

| KR | 101406981 B1 | 6/2014 |
|---|---|---|
| KR | 20180108973 A | 10/2018 |

OTHER PUBLICATIONS

Nelson F. Lie et al, Augmenting Statistical Machine Translation with Subword Translation of Out-of-Vocabulary Words, 2018, retreived from https://arxiv.org/abs/1808.05700.

Yulia Tsvetkov and Chris Dyer, Lexicon Stratification for Translating Out-of-Vocabulary Words, 2015, etreived from http://www.cs.cmu.edu/~ytsvetko/papers/loanwords-in-mt.pdf.

* cited by examiner

METHOD AND SYSTEM FOR REMOTE COMMUNICATION BASED ON REAL-TIME TRANSLATION SERVICE

CROSS-REFERENCE TO RELATED APPLICATIONS

This application claims the priority of the Korean Patent Applications NO 10-2020-0188504 filed on Dec. 30, 2020, in the Korean Intellectual Property Office, the disclosure of which is incorporated herein by reference.

BACKGROUND OF THE DISCLOSURE

Field of the Disclosure

The present disclosure relates to a method and a system for remote communication based on a real-time translation service and, more particularly, to a method and a system for remote communication based on a real-time translation service that translates and provides voice and/or text data between users performing remote communication.

Related Art

Collaboration software or groupware, a collaboration tool, enables multiple users to perform an integrated project simultaneously in a remote work environment. As more and more people started using it, the value of collaboration tools increased.

These collaboration tools are divided into three categories according to the level of collaboration, where the three categories are communication tools, meeting tools, and collaboration management tools.

More specifically, a collaboration tool may include one or more of the communication tool that promotes sharing of information by exchanging messages, files, data, or documents; the meeting tool that promotes sharing of information more interactively; and the management tool that manages and promotes activities within a group.

The collaboration tool may be web-based software or software on a desktop PC. Also, as mobile devices are widely used, the collaboration tool may be software for business processing and communication on mobile devices.

However, in communication between users who send and receive messages using the collaboration tool, there was a problem in that smooth communication for collaboration was difficult to achieve when a message exchanged contains at least one of a technical term, an abbreviation used by a specific group, or a new business word for which dictionary definitions do not exist.

Also, as the network-based Internet spreads worldwide, communication between international users is becoming more common.

However, this implies that a user may encounter a language barrier when communicating with a remote user.

Thus, the prior art provides several techniques for overcoming the language barrier.

For example, when communication is performed based on an instant messaging tool between remote users who speak different languages, the users type instant messages exchanged with each other using a translation program or a website that translates the instant messages into their language or their preferred language and translate the typed messages into a destination language.

After that, communication between users who speak different languages is enabled by cutting out the translated message and pasting the translated message into a text field of an instant messaging tool.

Although the method may be effective, a series of processes requiring continuous cutting and pasting of messages and switching between applications not only hinder smooth communication between users but also impede the corresponding remote communication.

Moreover, the process of searching for and determining a translation tool with proven performance may also be difficult for users, and even if a specific translation tool is selected based on some criteria, the corresponding translation tool may not guarantee to support all languages required by users.

In other words, users who perform international communication using the prior art have to put up with the inconvenience of searching for and using a plurality of translation tools for communication with various contacts around the world.

Meanwhile, when international communication between users who speak different languages is performed, not only instant messages based on text data but also remote communication based on voice data may be performed.

However, conventional collaboration communication tools do not provide sufficient performance to translate voice data spoken in different languages into a language optimized for each user and convert the translated voice data in a way desired by the users (for example, providing translated voice data as text or providing translated voice data as an audio signal); therefore, it is necessary to develop and introduce technology to solve the problem.

PRIOR ART REFERENCES

Patents (Patent 1) KR 2008-0094068 A

SUMMARY

The present disclosure has been made to solve the problem above and intends to provide a method and a system for remote communication based on a real-time translation service that translates and provides voice and/or text data between users of remote communication speaking different languages.

Technical objects to be achieved by the present disclosure and embodiments according to the present disclosure are not limited to the technical objects described above, and other technical objects may also be addressed.

A method for remote communication based on a real-time translation service according to an embodiment, as a method providing remote communication based on a real-time translation service by a real-time translation application executed by at least one or more processors of a computing device, comprises performing augmented reality-based remote communication; setting an initial value of a translation function for the remote communication; obtaining communication data of other users through the remote communication; performing language detection for the obtained communication data; when a target translation language is detected within the communication data from the performed language detection, translating communication data of the target translation language detected; and providing the translated communication data.

A method and a system for remote communication based on a real-time translation service according to an embodiment of the present disclosure translate and provide voice and/or text data between users of remote communication speaking different languages, thereby translating and providing voice and/or text data transmitted and received between users of remote communication speaking different languages easily and quickly into a language customized for each user, through which users may perform mutual communication conveniently using a communication tool that performs collaboration between the users without involving a separate translation tool or process.

Also, when communication data contains terms that do not have dictionary definitions, a method and a system for remote communication based on a real-time translation service according to an embodiment of the present disclosure define and provide the corresponding terms based on the inputs of users transmitting and receiving the corresponding terms, thereby facilitating more smooth communication between users performing remote communication.

The technical effects of the present disclosure are not limited to the technical effects described above, and other technical effects not mentioned herein may be understood clearly from the description below.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure; and should not be understood to preclude the possibility of adding one or more other features or constituting elements. Also, constituting elements in a figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

Figure 1:
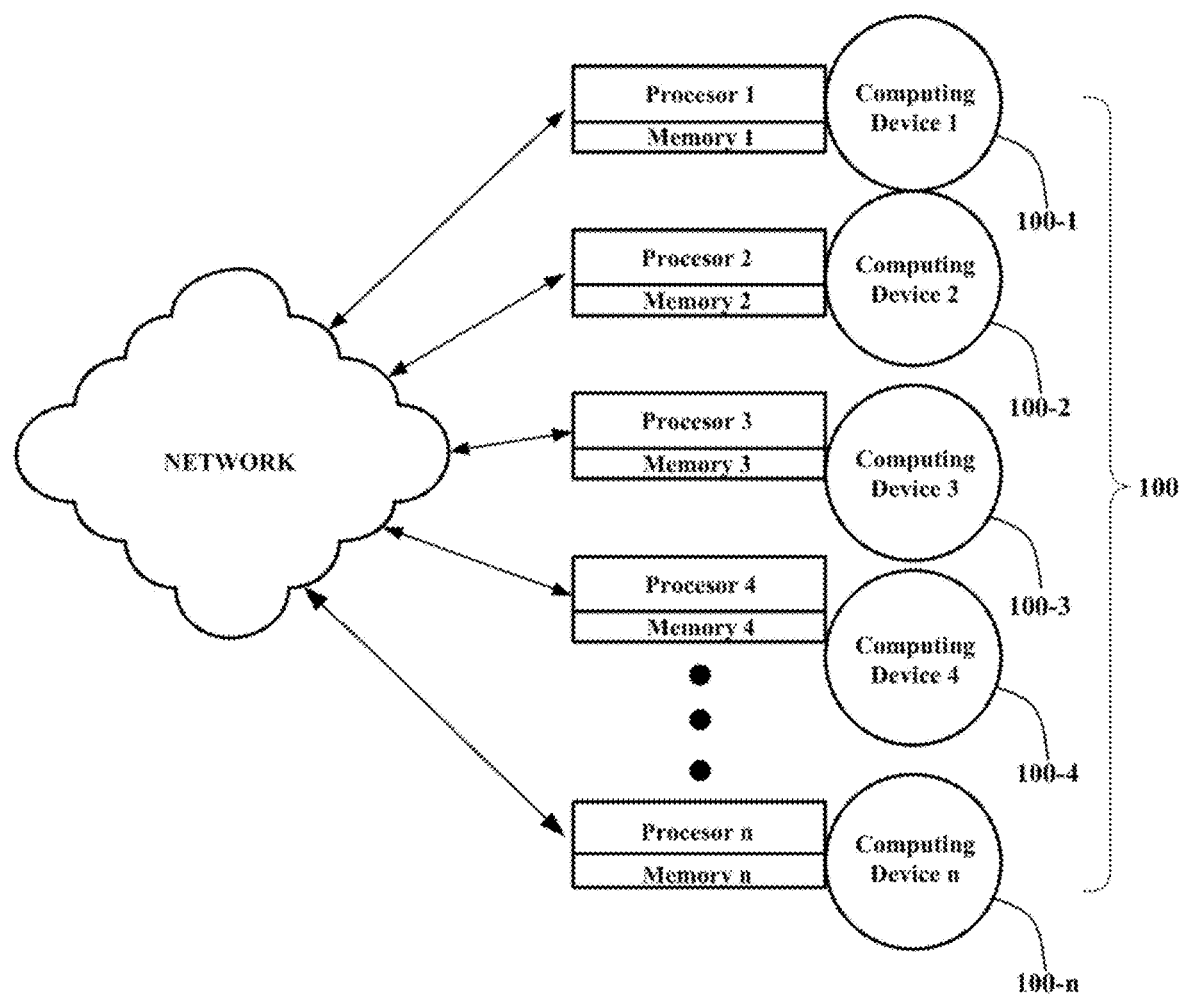
FIG. 1 illustrates a system for remote communication based on a real-time translation service according to an embodiment of the present disclosure.

FIG. 1 illustrates a system for remote communication based on a real-time translation service according to an embodiment of the present disclosure.

Referring to FIG. 1, a system for remote communication based on a real-time translation service according to an embodiment of the present disclosure (in what follows, a remote communication system) may provide a real-time translation service that translates and provides voice and/or text data between users of remote communication speaking different languages.

The system for remote communication providing a real-time translation service according to an embodiment of the present disclosure may be implemented using at least one computing device 100-1, 100-2, 100-3, 100-4, . . . , 100-n; 100.

At this time, the at least one or more computing devices 100 may be connected through a network.

Here, the network refers to a connection structure that exchanges information between individual nodes such as at least one or more wearable devices 100. Examples of such a network include a 3rd Generation Partnership Project (3GPP) network, a Long Term Evolution (LTE) network, a World Interoperability for Microwave Access (WIMAX) network, the Internet, a Local Area Network (LAN), a Wireless Local Area Network (Wireless LAN), a Wide Area Network (WAN), a Personal Area Network (PAN), a Bluetooth network, a satellite broadcasting network, an analog broadcasting network, and a Digital Multimedia Broadcasting (DMB) network but are not limited to the examples.

In what follows, the computing device 100 implementing a remote communication system will be described in detail with reference to appended drawings.

Computing Device: 100

The computing device 100 according to an embodiment of the present disclosure may be a predetermined computing device installed with a real-time translation application (in what follows, a translation application) providing a real-time translation service.

Specifically, from a hardware point of view, the computing device 100 may include a mobile-type computing device 100, a desktop-type computing device 100, and/or a wearable-type computing device 100 installed with a translation application.

Here, the mobile-type computing device 100 may be a mobile device such as a smartphone or a tablet PC installed with a translation application.

For example, the mobile-type computing device 100 may include a smartphone, a mobile phone, a digital broadcast terminal, a personal digital assistant (PDA), a portable multimedia player (PMP), and a tablet PC.

Also, the desktop-type computing device 100 may include a device installed with a program for executing a real-time translation service based on wired/wireless communication, such as a personal computer like a fixed-type desktop PC, a laptop computer, and an ultrabook installed with a translation application.

Also, the wearable-type computing device 100 allows a user to freely perform a computing action while the user is moving or performing an activity by being attached to the user's body or clothes and may further mean an application capable of performing particular computing functions.

The wearable-type computing device 100 may include smart glasses, a smart watch, and/or a head-mounted display (HMD) installed with a translation application implementing a real-time translation service.

Meanwhile, from a functional point of view, the computing device 100 may include at least one or more processors for data processing and at least one or more memories storing various application programs, data, and/or commands for providing a real-time translation service.

Here, the memory may store one or more of an operating system (OS), various application programs, data, and commands for providing a real-time translation service.

Also, the memory may include a program area and a data area.

Here, the program area according to the embodiment may be linked between an operating system (OS) for booting the computing device 100 and functional elements. The data area may store data generated according to the use of the computing device 100.

The memory according to the embodiment may be one of various storage devices, such as a ROM, a RAM, an EPROM, a flash drive, and a hard drive, or web storage that performs a storage function of the memory on the Internet. Also, the memory may be a recording medium detachable from the computing device 100.

Meanwhile, the processor may control the overall operation of each unit included in the corresponding computing device to implement a real-time translation service.

The processor may be a system-on-a-chip (SOC) suitable for a computing device 100 including a central processing unit (CPU) and/or a graphics processing unit (GPU), execute an operating system (OS) stored in the memory and/or an application program, and control each constituting element installed in the computing device 100.

Also, the processor may communicate internally with each constituting element through a system bus and may include one or more predetermined bus structures including a local bus.

Also, the processor may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for performing other functions.

Method for Remote Communication Based on a Real-Time Translation Service

In what follows, a method for performing remote communication based on a real-time translation service by a translation application executed by at least one or more processors of the computing device 100 will be described in detail with reference to FIGS. 2 to 6.

At this time, a user according to the present embodiment may be either a user who transmits communication data at a remote site or a user who receives the communication data.

At least one or more processors of the computing device 100 according to an embodiment of the present disclosure may execute at least one or more translation applications stored in at least one or more memories or run the applications in the background.

Figure 2:
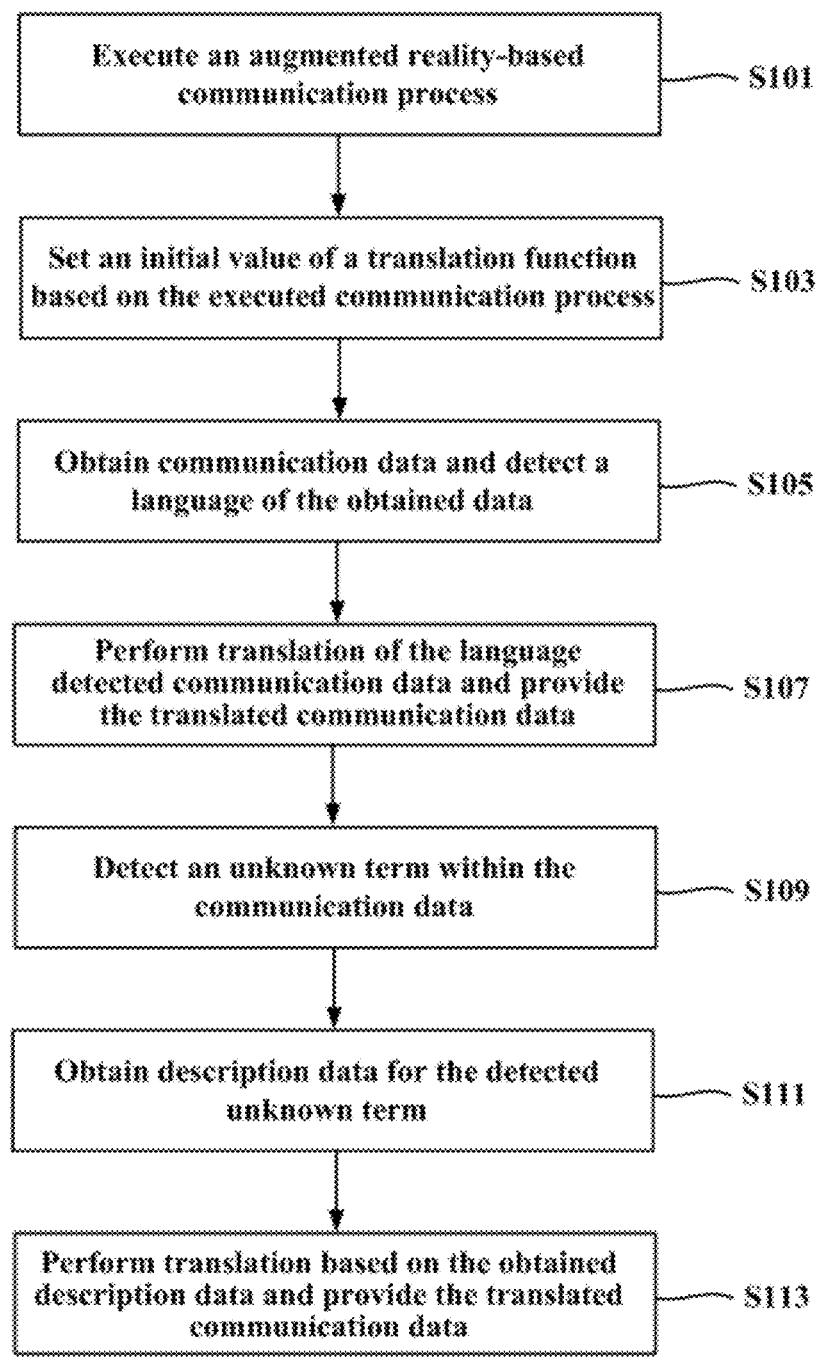
FIG. 2 is a flow diagram illustrating a method for remote communication based on a real-time translation service according to an embodiment of the present disclosure.

FIG. 2 is a flow diagram illustrating a method for remote communication based on a real-time translation service according to an embodiment of the present disclosure.

Referring to FIG. 2, the translation application according to the embodiment executed by at least one or more processors of the computing device 100 or run in the background may execute augmented reality (AR)-based remote communication S101.

Specifically, the translation application according to the embodiment may execute AR-based remote communication implementing collaboration between remote users.

At this time, the translation application may provide an AR-based remote communication service supporting mutual communication using a predetermined virtual object (for example, a virtual object providing predetermined guidance) based on AR-based remote communication.

Also, the translation application according to the embodiment may set the initial values of a translation function based on remote communication executed.

Specifically, the translation application according to the embodiment may set the initial setting values of a function performing translation between different languages based on a user input (here, a receiving user) and/or a built-in process.

More specifically, the translation application according to the embodiment may provide a translation initial value setting interface which is a user interface through which initial values of a translation function may be set.

Also, the translation application may obtain a user input (here, a receiving user) based on the provided translation initial value setting interface.

And the translation application may set the initial values of the translation function according to the obtained user input.

Alternatively, the translation application according to another embodiment may automatically set the initial values of the translation function to default values using a predetermined algorithm based on a built-in process.

Returning to the description, when the initial values of the translation function are set based on user input (here, a receiving user) and/or a built-in process, the translation application may 1) determine whether to activate the translation function.

In other words, the translation application according to the embodiment may selectively determine whether to use a translation function.

Also, the translation application according to the embodiment may set 2) translation parameter values.

Here, translation parameters according to the embodiment may indicate the parameters set with default values for providing a translation function.

In the embodiment, the translation parameter may include a target translation language that is to be translated (namely, translated language) and a reference language used as a reference (namely, translating language) for translation of the target translation language.

For example, when the target translation language is "English" and the reference language is "Korean," the translation application may translate text and/or voice data detected as English into Korean.

At this time, the translation application according to the embodiment may set at least one or more languages as the target translation language.

For example, when "English, French, and Japanese" are set as the target translation language, and "Korean" is set as the reference language, the translation application may translate and provide text and/or voice data detected as English, French, or Japanese into text and/or voice data in Korean.

Also, the translation application according to the embodiment may 3) determine an output method for a translated language.

Specifically, the translation application according to the embodiment may determine an output method for a translated language obtained by translating a target translation language based on a reference language.

The translation application according to the embodiment may determine the output method between a method of outputting both the original language in which a target translation language stays in its original state before translation and the translated language in which the target translation language has been translated or a method of selecting and outputting one of the translated language and the original language.

Also, the translation application according to the embodiment may 4) determine a method for obtaining voice data.

Specifically, the translation application may determine a method for obtaining voice data received from a remote user (namely, a sending user).

The translation application according to the embodiment may determine the method for obtaining voice data between a method of recording (storing) and providing received voice data and a method of obtaining and providing received voice data in the form of real-time streaming.

Also, the translation application according to the embodiment may 5) determine whether to convert voice data.

Specifically, the translation application according to the embodiment may determine whether to convert voice data received from a remote user (namely, a sending user) into text data and display the text data.

Also, the translation application according to the embodiment may determine whether to provide the voice data in the form of an audio signal (namely, human voice) based on a predetermined computer program (for example, Text-to-Speech (TTS)).

As described above, the translation application performs detailed settings of a translation function that performs transformation (translation) between different languages, thereby providing a user-customized (here, a receiving user) translation function. In other words, the translation application may set a target translation language and a reference language in a way desired by the user and allows the user to check a translation result obtained based on the settings in a form preferred by the user (for example, displaying both the original language and the translated language or displaying only one of the languages).

Also, the translation application according to the embodiment may obtain communication data from a plurality of users and may perform language detection on the obtained communication data S105.

Specifically, the translation application according to the embodiment may obtain communication data from the computing device 100 of a plurality of users (here, a plurality of sending users).

Here, the communication data according to the embodiment may refer to text data and/or voice data transmitted and received mutually for communication between remote users.

Also, the translation application according to the embodiment may perform language detection on the obtained communication data.

In other words, the translation application may perform language detection to determine on which language among a plurality of language categories the obtained communication data is based.

Also, the translation application according to the embodiment may perform the language detection to determine to which of the preconfigured target translation language and reference language the obtained communication data belongs.

When it is determined that the detected language is the reference language, the translation application may keep the corresponding communication data unchanged.

Also, when it is determined that the detected language is the target translation language, the translation application may detect and process the corresponding communication data as a language requiring translation.

Also, when it is determined that the detected language is a language other than the preconfigured target translation language and reference language, the translation application may detect and process the corresponding communication data as a predetermined third language.

For example, the translation application may detect the language of communication data obtained from the computing device 100 of a first sending user as a first target translation language, detect the language of communication data obtained from the computing device 100 of a second sending user as a second target translation language, and detect the language of communication data obtained from the computing device 100 of a third sending user as a predetermined third language.

When the obtained communication data is detected as using a predetermined third language, the translation application according to the embodiment may provide a user interface for determining whether to include the corresponding third language in the target translation language.

Also, the translation application may set or exclude the third language as a target translation language based on the user input (here, the receiving user) through the user interface described above.

Figure 3:
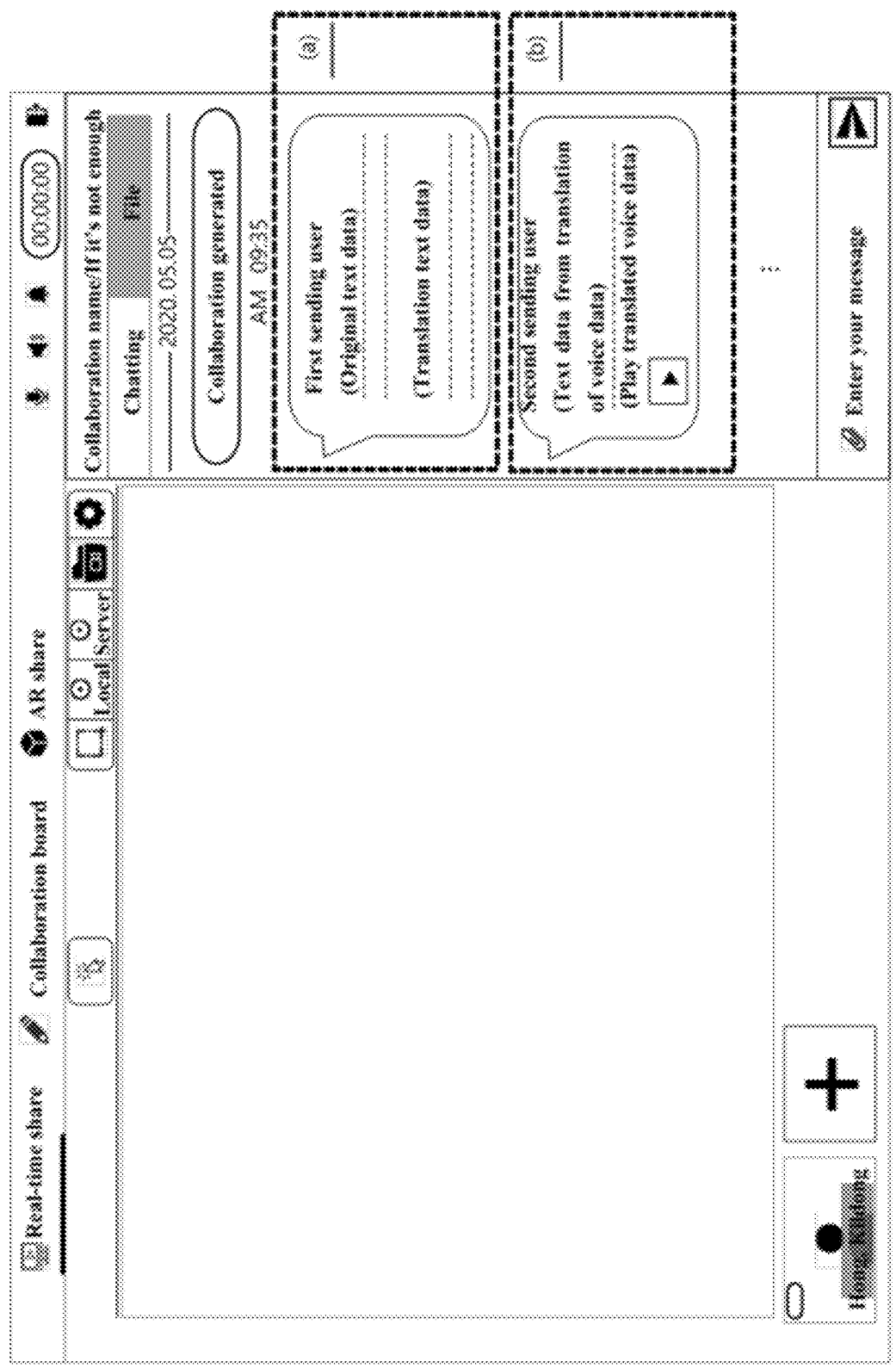
FIG. 3 is an example in which communication data is translated and provided according to an embodiment of the present disclosure.

FIG. 3 is an example in which communication data is translated and provided according to an embodiment of the present disclosure.

Also, referring to FIG. 3, the translation application according to the embodiment may translate the communication data for which language detection has been performed and provide the translated communication data S107.

Specifically, the translation application according to the embodiment may translate the communication data detected as a target translation language among communication data (in the embodiment, text data and/or voice data) obtained from the computing devices 100 of a plurality of users (here, a plurality of sending users) based on a reference language and provide the translated communication data.

Here, a process in which the translation application according to the embodiment translates communication data may be performed based on a predetermined translation algorithm (for example, predetermined AI-based translation algorithm such as Google translation algorithm and/or Naver translation algorithm). It should be noted that the embodiment of the present disclosure does not limit the algorithm itself for performing translation on communication data.

More specifically, referring to FIG. 3(a), the translation application according to the embodiment may translate at least one text data detected as being in a target translation language into a predetermined reference language and output the translated at least one text data.

At this time, the translation application according to the embodiment may output and provide only the translated text data or output and provide the translated text data together with the original text data before translation.

Also, the translation application according to the embodiment may provide the translated text data in the form of an audio signal (namely, human voice) based on a predetermined computer program (for example, Text-to-Speech (TTS)).

Also, referring to FIG. 3(b), the translation application according to the embodiment may translate at least one voice data detected as being in a target translation language into a predetermined reference language and output the translated at least one voice data.

Specifically, the translation application according to the embodiment may convert the corresponding voice data into text data in real-time.

More specifically, the translation application according to the embodiment may obtain voice data in sentence units in real-time.

Also, the translation application may convert the voice data obtained in sentence units into text data in real-time.

Also, the translation application may translate the data, which is obtained by converting the voice data in sentence units into text data in real-time, based on a reference language and provide the translated data.

The translation application according to another embodiment may obtain the corresponding voice data in conversation units in real-time.

In other words, the translation application according to the present embodiment may receive the corresponding voice data in conversation units where the unit ranges from a starting point to an ending point of the voice data.

For example, the translation application may receive the whole voice data ranging from a point where the first user's speech starts to a point where the speech ends.

And in an example, the translation application may translate and provide the voice data in a conversation unit comprising the whole received conversation based on the reference language.

In this case, the translation application according to the embodiment may output and provide only the text data converted and translated from voice data or provide the converted and translated text data together with an audio signal (namely, human voice) obtained based on the conversion of the text data by a predetermined computer program (for example, Text-to-Speech (TTS)).

As described above, the translation application translates and provides text data and/or voice data exchanged in a remote communication environment according to the user's settings, thereby allowing communication between users using different languages to be performed quickly and conveniently without involving a separate translation tool or process.

Figure 4:
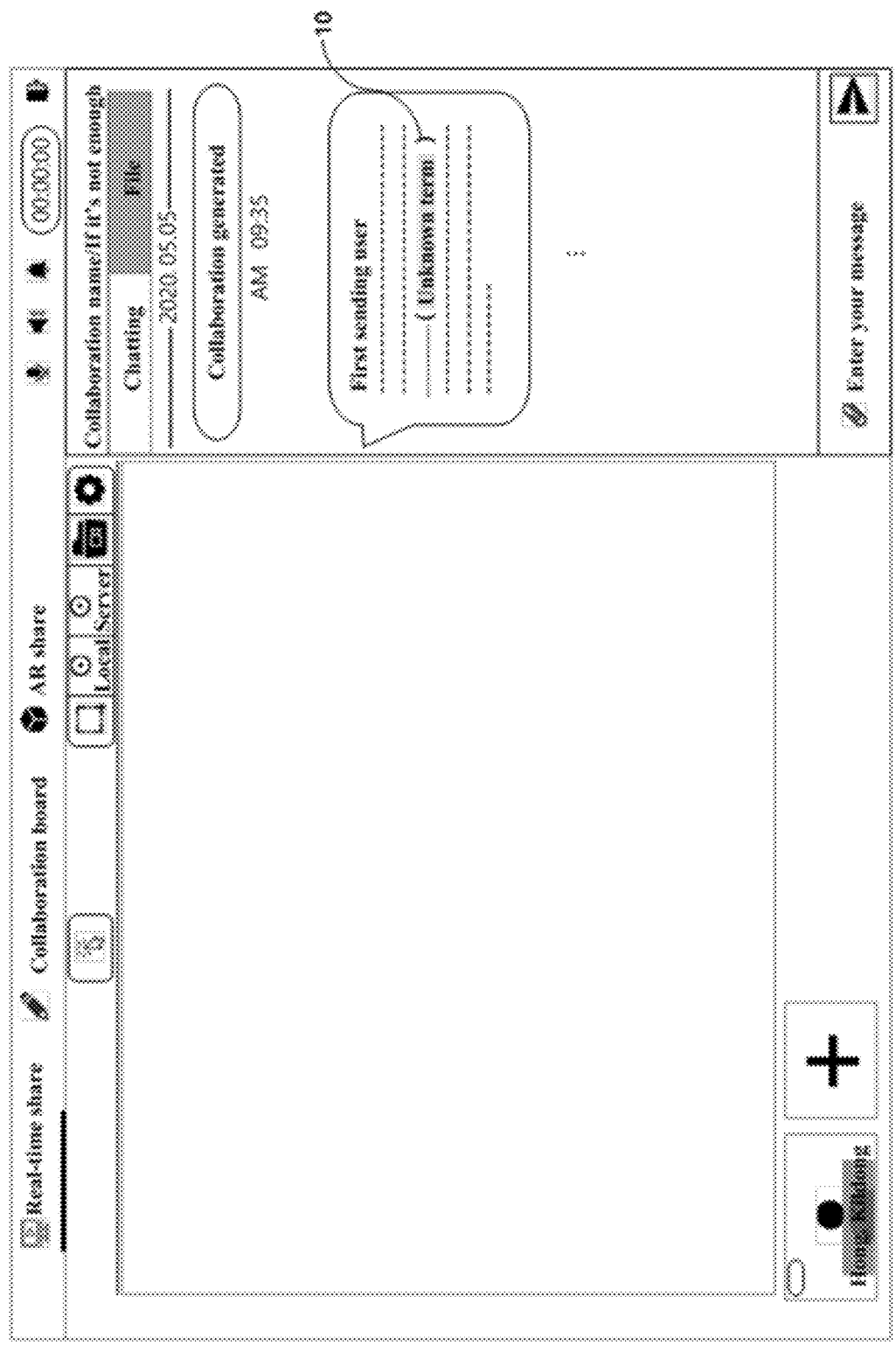
FIG. 4 is an example in which an unknown term is detected and emphasized with a highlight according to an embodiment of the present disclosure.

FIG. 4 is an example in which an unknown term is detected and emphasized with a highlight according to an embodiment of the present disclosure.

Also, referring to FIG. 4, the translation application according to the embodiment may detect an unknown term 10 within communication data S109.

Here, the unknown term 10 according to the embodiment refers to the term not defined in a dictionary, for which translation based on a predetermined translation algorithm (for example, a predetermined AI-based translation algorithm such as Google translation algorithm and/or Naver translation algorithm) is not possible.

For example, the unknown term 10 may include technical terms and/or abbreviations used in a specific field.

Specifically, suppose communication data is translated based on a predetermined translation algorithm. When the algorithm detects a term for which translation is impossible because the term exists outside the range supported by the database for the translation algorithm, the translation application according to the embodiment may pick out the detected term as an unknown term 10.

Also, when an unknown term 10 is detected within the corresponding communication data, the translation application according to the embodiment may provide a notification for the detected unknown term 10.

More specifically, when an unknown term 10 is detected from text data, the translation application according to the embodiment may translate the text data that includes the detected unknown term 10 and provide a notification for the unknown term 10 within the text data when outputting the translated text data.

The translation application according to the embodiment may emphasize (for example, with a highlight) a portion corresponding to the unknown term 10 within the text data when outputting the translated text data.

In this case, the translation application may output and provide the original text data without a separate translation applied to the unknown term 10.

Also, the translation application according to the embodiment may provide detection information for the unknown term 10 to at least two or more users.

Specifically, based on the computing device 100 of a sending user providing text data from which the unknown term 10 has been detected and the computing device 10 of a receiving user receiving the text data, the translation application may provide detection information on the unknown term 10.

For example, the translation application may output the detection information on the unknown term 10 by including information on whether the unknown term 10 has been detected, text data from which the unknown term 10 has been detected, and/or the translated text data in the detection information on the unknown term 10 and provide the output detection information to the sending user and the receiving user.

Also, when an unknown term 10 is detected from voice data and the voice data including the detected unknown term 10 is translated and provided, the translation application according to the embodiment may provide a notification for the unknown term 10 according to a method of providing the translated voice data.

Specifically, suppose voice data is converted to text data and the converted text data is provided. When the text data is translated and outputted, the translation application according to the embodiment may provide the translated text data by emphasizing (for example, with a highlight) a portion corresponding to the unknown term 10 within the corresponding text data.

Meanwhile, when voice data is provided as an audio signal based on a predetermined computer program (for example, Text-to-Speech (TTS)), the translation application according to the embodiment may output and provide the portion containing the unknown term 10 as the original voice data (namely, untranslated original sound data).

For example, when the unknown term 10 is provided while translated voice data is being output in a predetermined audio signal, the translation application may output and provide untranslated original voice data as an audio signal.

Also, the translation application according to the embodiment may provide detection information on the unknown term 10 based on the computing device 100 of a sending user providing voice data from which the unknown term 10 has been detected and the computing device 100 of a receiving user receiving the text data obtained from translation of the voice data.

For example, the translation application may output the detection information on the unknown term 10 by including information on whether the unknown term 10 has been detected, text data from which the unknown term 10 has been detected, and/or the translated text data in the detection information on the unknown term 10 and provide the output detection information to the sending user and the receiving user of the voice data.

As described above, when communication data is translated and provided, the translation application detects an unknown term 10 that may not be translated since the term is a technical term and/or an abbreviation used only in a specific field and notifies users exchanging the communication data that the unknown term 10 has been detected, thereby minimizing a problem that accuracy and reliability of communication between users are degraded due to the unknown term 10 and further improving the collaboration quality based on a remote communication environment.

Figure 5:
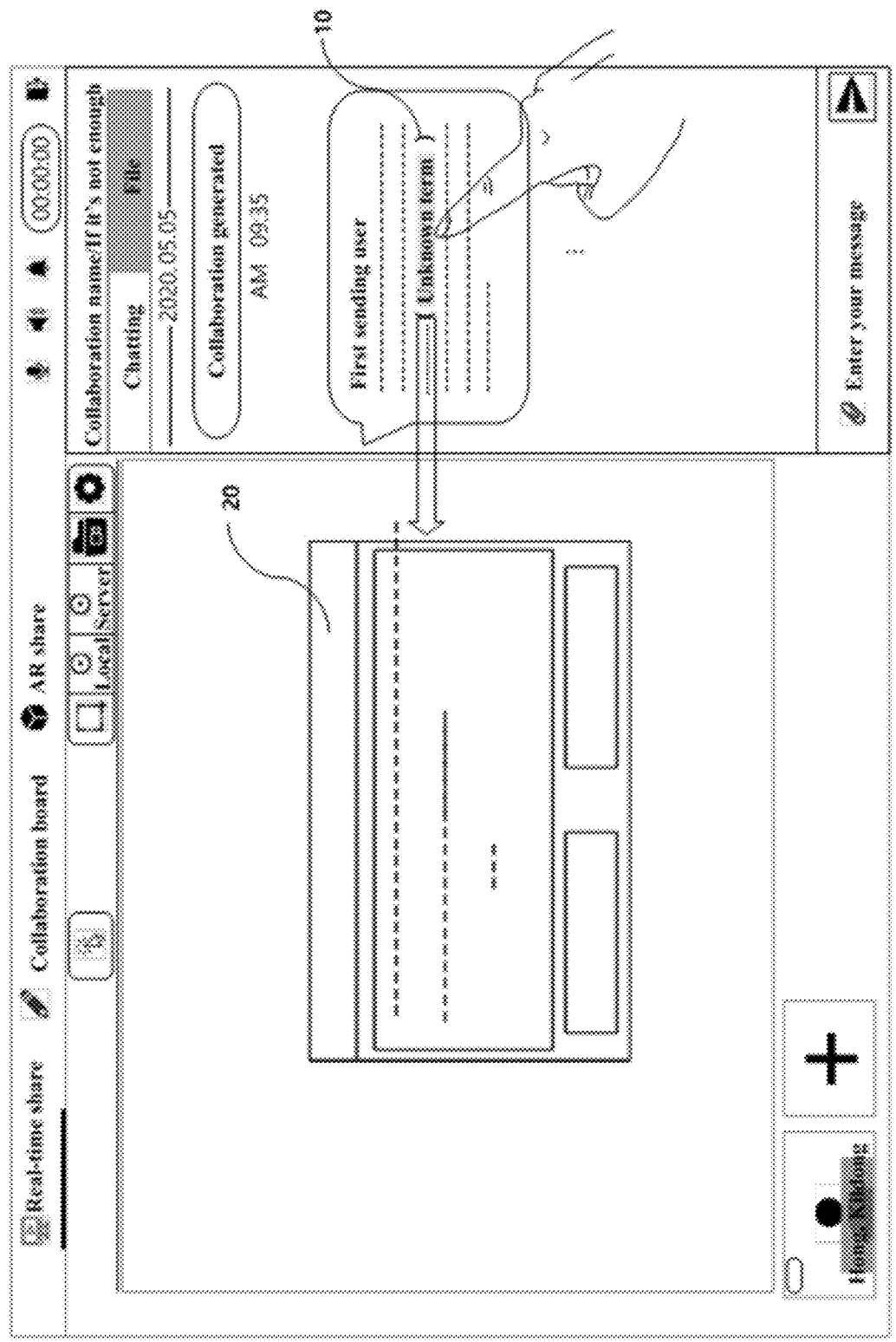
FIG. 5 is an example illustrating a method for obtaining data describing an unknown term according to an embodiment of the present disclosure.

FIG. 5 is an example illustrating a method for obtaining data describing an unknown term 10 according to an embodiment of the present disclosure.

Also, referring to FIG. 5, the translation application according to the embodiment may obtain description data for a word of a detected unknown term 10 (in what follows, an unknown word).

Specifically, the translation application according to the embodiment may request a definition of a detected unknown word from at least one or more users (in the embodiment, a sending user and/or a receiving user).

Specifically, the translation application according to the embodiment may provide a word definition user interface 20 through which a definition for an unknown word may be input.

Also, the translation application may obtain a user definition (in the embodiment, description data) for the unknown word based on user input through the provided word definition user interface 20.

More specifically, the translation application according to the embodiment may obtain an input of a first sending user based on the word definition user interface 20 from the computing device 100 of a sending user.

Also, the translation application according to the embodiment may generate description data for the corresponding unknown word based on the obtained input of the first sending user.

Here, the description data according to the embodiment may be text and/or voice data describing an unknown word.

Also, the translation application according to the embodiment may translate the generated description data based on the reference language.

And the translation application may output the translated description data and provide the translated description data to a receiving user.

At this time, the translation application according to the embodiment may obtain information on whether to accept the description data (namely, whether the description is understood) based on the input of the receiving user through a predetermined user interface (in the embodiment, the word definition user interface 20).

In other words, the translation application may determine, according to the input of a receiving user, whether the receiving user has understood the description data generated according to the definition written by a sending user.

Subsequently, when the corresponding description data is accepted (that is, when the receiving user understands the description data), the translation application according to the embodiment may store the corresponding translated description data by matching the corresponding translated description data to the corresponding unknown word.

As described above, the translation application obtains a definition for an unknown word difficult to translate because of the word's unclear dictionary definition from a user who has sent the unknown word, provides, and manages the obtained definition, thereby constructing the application's internal database collecting description data for the words not registered on an existing translation database.

Also, through the operation above, when communication data that includes the corresponding unknown word is translated and provided later, the translation application may retrieve and provide information from the internally constructed database, thereby allowing a user receiving the corresponding communication data to understand the data and perform communication more easily and quickly.

At this time, when the description data is composed of less than a predetermined number of words, the translation application according to the embodiment may store the description data by matching the description data directly to the corresponding unknown word.

On the other hand, when the description data is composed of more than a predetermined number of words, the translation application according to the embodiment may request a receiving user to set an abbreviation for the corresponding unknown word.

The translation application may store the abbreviations determined according to the input of the receiving user by matching the abbreviations to the corresponding unknown words and/or description data.

Specifically, the translation application according to the embodiment may provide an abbreviation setting interface capable of obtaining input of a user (here, a receiving user) setting an abbreviation.

Also, the translation application according to the embodiment may set an abbreviation for the unknown word based on a user input through the provided abbreviation setting interface.

And the translation application according to the embodiment may store the abbreviation set as above by matching the abbreviation to the corresponding unknown word and/or description data.

For example, when the first unknown word is "l10n," the translation application may obtain description data for the first unknown word as "Localization may be abbreviated as L10N or l10n. The abbreviation is made by the number of letters in the English spelling of the word minus the first and last letters."

Also, in an example, the translation application may provide an abbreviation setting interface when it is determined that the obtained description data is composed of more than a predetermined number of words.

In the example, the translation application may obtain the input of a receiving user, which sets an abbreviation to the first unknown word, as "localization" based on the provided abbreviation setting interface.

Also, in the example, the translation application may set an abbreviation for the first unknown word based on the receiving user's input obtained above.

And the translation application in the example may store the set abbreviation by matching the abbreviation to the first unknown word and/or the description data.

Depending on an embodiment, when an abbreviation is not set for an unknown word (in the embodiment, when a receiving user's input that sets an abbreviation to the corresponding unknown word does not exist), the translation application may set the unknown word itself as an abbreviation.

As described above, when description data for an unknown word exceeds a predetermined length, the translation application sets and provides an abbreviation of the description data according to a receiving user's input and thereby, when the corresponding unknown word is translated and provided later, translates and provides the unknown word according to the form easy for the receiving user to understand based on the information defined more simply and clearly.

On the other hand, when a receiving user's input based on a predetermined user interface (in the embodiment, the word definition user interface 20) does not accept the corresponding description data (in other words, when the receiving user does not understand the description data), the translation application according to the embodiment may transmit the description data to the computing device 100 of a third user other than the sending user and the receiving user.

At this time, the translation application may translate the description data based on the reference language of the third user (namely, the reference language preconfigured by the third user) and transmit the translated description data.

Also, according to the embodiment, the computing device 100 of the third user who has received the description data transmitted after being translated based on the reference language of the third user (in what follows, a different reference language) may generate information on whether to accept the received description data.

Specifically, according to the embodiment, the computing device 100 of the third user may determine whether to accept the description data translated according to the different reference language based on the user's input (here, the third user) through a predetermined user interface (in the embodiment, the word definition user interface 20 provided to the third user).

At this time, when the description data is accepted, the computing device 100 of the third user may transmit the corresponding description data to the computing device 100 of a receiving user.

On the other hand, when the description data is not accepted, the computing device 100 of the third user may provide a predetermined user interface (in the embodiment, the word definition user interface 20 provided to the third user) capable of performing modification of the description data.

And the computing device 100 of the third user may modify the description data based on the user's input (here, the third user) through the provided user interface.

At this time, in the embodiment, the computing device 100 of the third user may modify the description data based on the different reference language.

Also, in the embodiment, the computing device 100 of the third user may transmit the modified description data to the computing device 100 of a receiving user.

Subsequently, the translation application of the computing device 100 of a receiving user who has obtained the description data modified based on the different reference language from the computing device 100 of the third user may translate the received description data according to the reference language of the receiving user.

And the translation application according to the embodiment may output and provide the translated description data.

Also, the translation application according to the embodiment may repeatedly perform a series of processes described above, which include determining whether to accept the description data (namely, whether the description data is understood) based on a receiving user's input through a predetermined user interface (in the embodiment, the word definition user interface 20), storing the corresponding translated description data by matching the translated description data to the corresponding unknown word according to the determination of whether to accept the description data, or transmitting the description data to the computing device 100 of the third user other than the sending and receiving users.

As described above, when the receiving user does not understand the description of the unknown word defined by the sending user, the translation application provides the corresponding description to the third user and additionally provides the description of the unknown word defined by the third user to the receiving user, thereby assist the receiving user to more clearly understand the unknown word.

Also, through the operation above, the translation application may allow a plurality of users to generate a definition for the unknown word, through which a description of the corresponding unknown word may be defined more accurately based on the effect of collaborative intelligence.

Meanwhile, the translation application according to another embodiment may obtain a receiving user's input by providing the word definition user interface 20.

Also, the translation application according to the present embodiment may generate description data for the corresponding unknown word based on a receiving user's input obtained.

At this time, the translation application may obtain description data according to the receiving user's input based on a reference language.

Also, the translation application according to the present embodiment may store the obtained description data by matching the description data to the corresponding unknown word.

As described above, when a receiving user does not accept the description of another user (for example, a sending user and/or a third user) defined for the corresponding unknown word, the translation application may set the description provided directly by the corresponding receiving user as a definition for the unknown word, thereby constructing an unknown word definition database optimized for a specific user.

At this time, when the description data is composed of less than a predetermined number of words, the translation application according to the embodiment may store the description data by matching the description data directly to the corresponding unknown word.

On the other hand, when the description data is composed of more than a predetermined number of words, the translation application according to the embodiment may request a receiving user to set an abbreviation for the corresponding unknown word.

The translation application may store the abbreviations determined according to the input of the receiving user by matching the abbreviations to the corresponding unknown words and/or description data.

Figure 6:
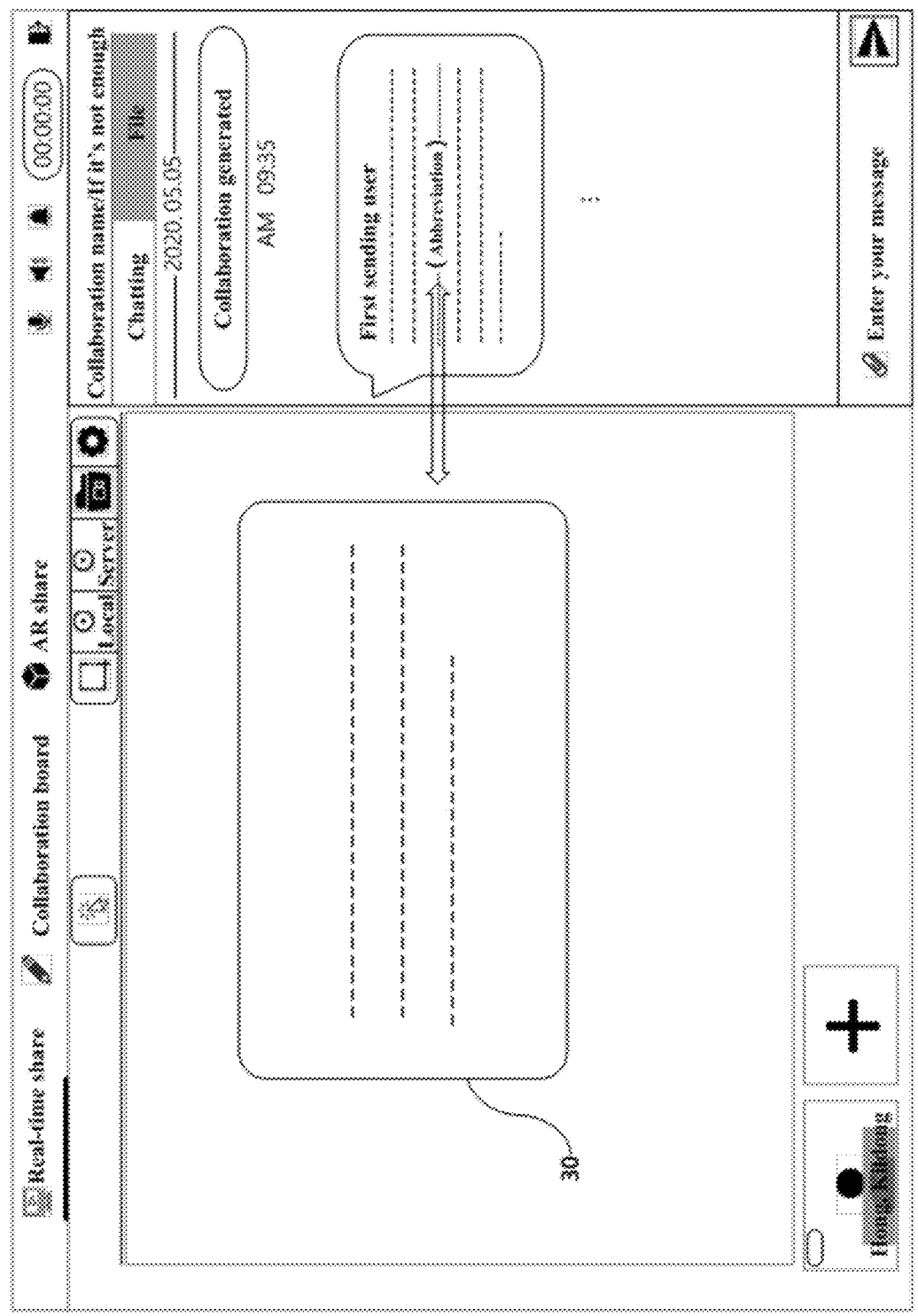
FIG. 6 is an example in which description data are provided according to an embodiment of the present disclosure.

FIG. 6 is an example in which description data are provided according to an embodiment of the present disclosure.

Also, referring to FIG. 6, the translation application according to the embodiment may translate the corresponding unknown word 10 based on the description data obtained as described above and provide the translated unknown word S113.

Specifically, the translation application according to the embodiment may obtain communication data from a plurality of users (here, a plurality of sending users) and perform language detection on the obtained communication data.

Also, the translation application may perform a translation process for the communication data determined as a target translation language through language detection for the communication data.

At this time, when an unknown term 10 is detected within the corresponding communication data while the translation is performed, the translation application may perform translation of the unknown word 10 based on the description data and/or an abbreviation matched to the word of the detected unknown term 10 (in the embodiment, the unknown word).

For example, when "l10n" is detected as an unknown term 10, the translation application may translate the unknown term 10 into "localization," an abbreviation matched to the word of the unknown term 10.

And the translation application in the example may output and provide the unknown term 10 translated as described above.

At this time, the translation application according to the embodiment may augment and display description data and/or an abbreviation matched to the unknown term 10 in the form of a virtual object 30.

For example, when "l10n" is detected as the unknown term 10, the translation application may augment and display "Localization may be abbreviated as L10N or l10n. The abbreviation is made by the number of letters in the English spelling of the word minus the first and last letters.", which is the description data matched to the unknown term 10, in the form of a predetermined virtual object 30.

As described above, when communication data contains terms that do not have dictionary definitions, the translation application may define and provide the corresponding terms based on the inputs of users transmitting and receiving the corresponding terms, thereby facilitating more smooth communication between users performing remote communication.

As described above, a method and a system for remote communication based on a real-time translation service according to an embodiment of the present disclosure translate and provide voice and/or text data between users of remote communication speaking different languages, thereby translating and providing voice and/or text data transmitted and received between users of remote communication speaking different languages easily and quickly into a language customized for each user, through which users may perform mutual communication conveniently using a communication tool that performs collaboration between the users without involving a separate translation tool or process.

Also, the embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with one or more software modules to perform the processes of the present disclosure, and vice versa.

Specific implementation of the present disclosure are embodiments, which does not limit the technical scope of the present disclosure in any way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of the present disclosure but has to be defined by the appended claims.

What is claimed is:

1. A method for remote communication based on a real-time translation service by a real-time translation application executed by at least one or more processors of a computing device, the method comprising:
performing augmented reality-based remote communication;
setting an initial value of a translation function for the remote communication;
obtaining communication data of other users through the remote communication;
performing language detection for the obtained communication data;
when a target translation language is detected within the communication data from the performed language detection, translating communication data of the target translation language detected; and
providing the translated communication data,
wherein the providing the translated communication data includes:
detecting an unknown term not having a dictionary definition from the communication data, obtaining description data for the detected unknown term, providing the obtained description data for the unknown term, and storing the description data and the unknown term into a database by matching the description data to the unknown word, wherein the storing the description data and the unknown term by matching the description data to the unknown term includes:

when the description data is composed of more than a predetermined number of words, setting an abbreviation to the unknown term, storing the set abbreviation by matching the set abbreviation to at least one of the unknown terms and the description data, and when an unknown term stored in the database is detected during the remote communication, providing the description data for the unknown term based on the abbreviation.

2. The method of claim 1, wherein the communication data includes at least one or more of text data and voice data exchanged between remote users.

3. The method of claim 2, wherein the setting an initial value of a translation function includes setting a target translation language which is a language that is to be translated and a reference language used as a reference for translation of the target translation language.

4. The method of claim 3, wherein the setting an initial value of a translation function includes at least one of setting a method for outputting a translation language, setting a method for obtaining voice data, and setting whether to convert the voice data.

5. The method of claim 3, wherein the translating communication data of the detected target translation language includes, when the communication data is a first text data, translating the first text data into a second text data composed of the reference language and the providing the translated communication data includes at least one or more of outputting the second text data, outputting the first text data, outputting the second text data into an audio signal based on a predetermined computer program, and outputting the second text data in the form of an augmented reality object.

6. The method of claim 3, wherein the translating communication data of the detected target translated language include, when the communication data is voice data, converting the voice data into a third text data for each predetermined unit and translating the third text data into a fourth text data composed of the reference language, Wherein the providing the translated communication data includes at least one or more of outputting the fourth text data and outputting the fourth text data into an audio signal based on a predetermined computer program.

7. The method of claim 3, wherein the performing language detection further comprising:

detecting the communication data in a third language other than the target translation language and the reference language and selectively setting the third language as the target translation language.

8. The method of claim 1, wherein the translating the communication data includes translating the communication data based on description data for the unknown term, and the providing the translated communication data includes providing the description data by augmenting and displaying the description data in the form of a virtual object.

9. A system for remote communication based on a real-time translation service, the system comprising:

a display outputting communication data;

at least one or more processors; and at least one or more memories, wherein the at least one application, as at least one application being stored in the memory and executed by the at least one or more processors and providing remote communication based on a real-time translation service, performs augmented reality-based remote communication;

sets an initial value of a translation function for the remote communication;

obtains communication data of other users through the remote communication;

performs language detection for the obtained communication data;

when a target translation language is detected within the communication data from the performed language detection, translates communication data of the target translation language detected; and provides the translated communication data, wherein the application detects an unknown term not having a dictionary definition from the communication data, obtains description data for the detected unknown term, provides the obtained description data for the unknown term, and stores the description data and the unknown term into a database by matching the description data to the unknown word, when the description data is composed of more than a predetermined number of words, sets an abbreviation to the unknown term, stores the set abbreviation by matching the set abbreviation to at least one of the unknown term and the description data, and when an unknown term stored in the database is detected during the remote communication, provides the description data for the unknown term based on the abbreviation.

* * * * *